US006547996B1

United States Patent
Kamiyama et al.

(10) Patent No.: US 6,547,996 B1
(45) Date of Patent: Apr. 15, 2003

(54) PRODUCTION APPARATUS OF EXPANSION-MOLDED ARTICLE, AUXILIARY MEMBER FOR TRANSFER OF FOAMED PARTICLES AND PRODUCTION METHOD OF EXPANSION-MOLDED ARTICLE

(75) Inventors: Makoto Kamiyama, Kanuma (JP); Hideo Ishikawa, Kanuma (JP)

(73) Assignees: JSP Corporation, Tokyo (JP); Yuugen Kaisha Iketakakou, Tuchigi-Ken (JP); Yuugen Kaisha Nikku, Tuchigi-Ken (JP)

( * ) Notice: Subject to any disclaimer, the term of this patent is extended or adjusted under 35 U.S.C. 154(b) by 338 days.

(21) Appl. No.: 09/587,895

(22) Filed: Jun. 6, 2000

Related U.S. Application Data

(62) Division of application No. 09/099,211, filed on Jun. 18, 1998, now Pat. No. 6,220,842.

(30) Foreign Application Priority Data

Jun. 18, 1997 (JP) ............................................. 9-177660

(51) Int. Cl.[7] .............................................. B29C 44/02
(52) U.S. Cl. .......................................... 264/51; 264/53
(58) Field of Search ...................... 264/51, 53; 425/4 R

(56) References Cited

U.S. PATENT DOCUMENTS

| 3,537,131 A | 11/1970 | Kracht et al. |
| 3,941,528 A | 3/1976 | Cotterell |
| 4,106,884 A | 8/1978 | Jegelka |
| 4,266,928 A | 5/1981 | Weidner et al. |
| 4,379,859 A | 4/1983 | Hirosawa et al. |
| 4,436,840 A | 3/1984 | Akiyama et al. |
| 4,440,703 A | 4/1984 | Akiyama et al. |
| 4,443,393 A | 4/1984 | Akiyama et al. |
| 4,464,484 A | 8/1984 | Yoshimura et al. |
| 4,482,306 A | 11/1984 | Hahn |
| 4,504,534 A | 3/1985 | Adachi et al. |
| 4,504,601 A | 3/1985 | Kuwabara et al. |
| 4,567,208 A | 1/1986 | Kuwabara et al. |

(List continued on next page.)

FOREIGN PATENT DOCUMENTS

| EP | 0068467 | 1/1983 |
| EP | 0071981 | 2/1983 |
| FR | 2225270 | 11/1974 |
| JP | 3295633 | 12/1991 |
| JP | 3295634 | 12/1991 |
| JP | 3295635 | 12/1991 |

*Primary Examiner*—Allan R. Kuhns
(74) *Attorney, Agent, or Firm*—Sherman & Shalloway

(57) ABSTRACT

Disclosed herein is a production apparatus of expansion-molded articles, comprising a mold equipped with a foamed particle feeder having a foamed-particle feed opening and a compressed-air ejection nozzle opening toward the mold, by which foamed particles contained in a hopper is filled into the mold through the foamed-particle feed opening by ejecting compressed air from the compressed-air ejection nozzle and then heated to expand them, and the foamed particles thus expanded are then cooled, thereby producing an expansion-molded article, wherein the apparatus is equipped with a compressed-air discharge orifice opening toward the foamed particle filling side of the apparatus in the course of a foamed-particle supply line connecting the hopper to the foamed-particle feed opening. An auxiliary member for transfer of foamed particles used in the production apparatus, and a production method of expansion-molded articles using this apparatus are also disclosed.

6 Claims, 11 Drawing Sheets

U.S. PATENT DOCUMENTS

| | | | |
|---|---|---|---|
| 4,568,608 | A | 2/1986 | Kuwabara et al. |
| 4,587,270 | A | 5/1986 | Kuwabara et al. |
| 4,598,001 | A | 7/1986 | Watanabe et al. |
| 4,602,082 | A | 7/1986 | Akiyama et al. |
| 4,676,939 | A | 6/1987 | Kuwabara |
| 4,685,872 | A | 8/1987 | Erlenbach |
| 4,692,507 | A | 9/1987 | Akiyama et al. |
| 4,693,856 | A | 9/1987 | Rubens et al. |
| 4,695,593 | A | 9/1987 | Kuwabara et al. |
| 4,698,191 | A | 10/1987 | Endo et al. |
| 4,704,239 | A | 11/1987 | Yoshimura et al. |
| 4,711,287 | A | 12/1987 | Kuwabara et al. |
| 4,716,021 | A | 12/1987 | Akiyama et al. |
| 4,749,725 | A | 6/1988 | Akiyama et al. |
| 4,756,948 | A | 7/1988 | Kuramochi et al. |
| 4,777,000 | A | 10/1988 | Kuwabara et al. |
| RE32,780 | E | 11/1988 | Yoshimura et al. |
| 4,818,451 | A * | 4/1989 | Arai et al. ................. 264/40.3 |
| 4,822,542 | A | 4/1989 | Kuwabara et al. |
| 4,840,973 | A | 6/1989 | Kuwabara et al. |
| 4,889,671 | A | 12/1989 | Akiyama et al. |
| 4,948,817 | A | 8/1990 | Kuwabara et al. |
| 5,053,435 | A | 10/1991 | Kuwabara et al. |
| 5,071,883 | A | 12/1991 | Kuwabara et al. |
| 5,085,814 | A | 2/1992 | Kamiyama et al. |
| 5,122,545 | A | 6/1992 | Kuwabara et al. |
| 5,130,341 | A | 7/1992 | Kuwabara et al. |
| 5,284,431 | A | 2/1994 | Kuwabara et al. |
| 5,340,841 | A | 8/1994 | Tokoro et al. |
| 5,391,581 | A | 2/1995 | Kuwabara et al. |
| 5,459,169 | A | 10/1995 | Tokoro et al. |
| 5,569,681 | A | 10/1996 | Tokoro et al. |
| 5,622,756 | A | 4/1997 | Tokoro et al. |
| 5,651,912 | A | 7/1997 | Mitsumoto et al. |
| 5,679,450 | A | 10/1997 | Tokoro et al. |
| 5,747,549 | A | 5/1998 | Tsurugai et al. |
| 5,928,776 | A | 7/1999 | Shioya et al. |
| 5,968,430 | A | 10/1999 | Naito et al. |
| 6,034,144 | A | 3/2000 | Shioya et al. |
| 6,077,875 | A | 6/2000 | Sasaki et al. |

\* cited by examiner

US 6,547,996 B1

PRODUCTION APPARATUS OF EXPANSION-MOLDED ARTICLE, AUXILIARY MEMBER FOR TRANSFER OF FOAMED PARTICLES AND PRODUCTION METHOD OF EXPANSION-MOLDED ARTICLE

This is a division of applicants' prior application Ser. No. 09/099,211, filed Jun. 18, 1998, now U.S. Pat. No. 6,220,842.

BACKGROUND OF THE INVENTION

1. Field of the Invention

The present invention relates to a production apparatus of expansion-molded articles, and particularly to a production apparatus of expansion-molded articles, which has been designed to effectively enhance the ability to fill foamed particles into a mold. The present invention also relates to an auxiliary member for transfer of foamed particles used in the production apparatus of expansion-molded articles. The present invention is further concerned with a method for producing an expansion-molded article using this apparatus.

2. Description of the Background Art

As methods of transferring foamed particles stored in a hopper to a mold and filling them into the mold upon molding of the foamed particles in the mold, there have heretofore been known the following methods:

(1) a method in which a mold is evacuated upon filling to set up an air current, and foamed particles are transferred to and filled into the mold by the air current (Japanese Patent Application Laid-Open No. 43762/1988);

(2) a method in which compressed air is ejected from a compressed-air ejection nozzle of a foamed particle feeder installed on a mold to set up an air current, and foamed particles are transferred to and filled into the mold by the air current (Japanese Patent Application Laid-Open Nos. 43762/1988, 46623/1987 and 77331/1993); and (3) a method in which foamed particles within a hopper are kept under pressure to set up an air current by using the pressure within the hopper and the method (2) in combination, and the foamed particles are transferred to and filled into the mold by the air current (Japanese Patent Application Laid-Open Nos. 176747/1985, 79625/1986 and 87327/1987, and Japanese Patent Publication No. 87364/1993).

However, only a differential pressure of 1 atm can be obtained at the most by the method (1). Therefore, the foamed particles have been unable to be filled at a high filling density into the mold. The method (1) has hence involved a problem that the resulting expansion-molded article tends to have poor interparticle fusion bonding or high shrinkage factor, and so percent defective increases. In addition, according to this method, it has also been difficult to conduct blow back of excess foamed particles not filled into the mold into the hopper.

If the blow back of the foamed particles is only incompletely carried out, there is a possibility that the foamed particles may remain in a space defined in the rear of a piston for closing a foamed particle introducing opening in the mold while the piston is being moved forward, and so the backward movement of the piston may be blocked by the foamed particles remained in the space defined in the rear of the piston, resulting in a failure to fully fill new foamed particles into the mold upon the next molding.

The method (2) permits the filling of the foamed particles at a higher filling density than the method (1). However, the method (2) has involved a problem that if the form of a mold cavity becomes somewhat complicated, a failure in filling of the foamed particles occurs, and consequently many of the resulting expansion-molded articles tend to have poor interparticle fusion bonding or high shrinkage factor, and so percent defective increases.

The failure in filling of the foamed particles caused by the complicated cavity form may be improved to some extent by installing an additional feeder in the mold. In order to install the additional feeder, however, it is necessary to newly make an additional hole for installing the feeder in the mold. However, the installation of the additional feeder involves undesirable problems that the strength of the mold may possibly be markedly deteriorated according to the position of the hole for installing the new feeder, and the installation of more feeders increases the number of marks of the tip form of the feeder transferred to the surface of the resulting expansion-molded article to deteriorate the external appearance of the expansion-molded article. In some cases, it has been impossible in itself to install the additional feeder. Namely, the position where the feeder is intended to install is a position corresponding to the surface of the resulting molded article on which the transferred mark should not be left, or in some cases the additional feeder may not be installed due to the presence of piping and the like in the machine. After all, the installation of the additional feeder cannot be a preferable means for solution.

The method (3) has involved a problem that since the foamed particles kept under pressure in the hopper are exposed to a pressure lower than the pressure within the hopper upon their filling, the foamed particles undergo volume expansion within the hopper, at the outlet of the hopper, or within a pipe, and the expanded foamed particles tend to clog the outlet or the pipe and the like. The clogging of the outlet or the pipe and the like with the foamed particles has offered a problem that a failure in filling of the foamed particles into the mold occurs. There has also been involved a problem that since the interior of the hopper is pressurized, blow back of excess foamed particles into the hopper cannot be effectively carried out.

SUMMARY OF THE INVENTION

The present invention has been completed in view of the foregoing circumstances, and has as its object the provision of a production apparatus of expansion-molded articles, which can solve the above-described drawbacks and certainly reduce defective molding attendant on a failure in filling.

Another object of the present invention is to provide an auxiliary member for transfer of foamed particles, which permits effective filling of the foamed particles into the production apparatus of expansion-molded articles.

A further object of the present invention is to provide a method for producing an expansion-molded article using the above production apparatus of expansion-molded articles.

According to the present invention, there is thus provided a production apparatus of expansion-molded articles, comprising a mold equipped with a feeder for filling foamed particles into the mold having a through-hole through which the foamed particles can pass and a compressed-air ejection nozzle opening toward the mold, by which foamed particles contained in a hopper is filled into the mold through the through-hole of the feeder by ejecting compressed air from the compressed-air ejection nozzle and then heated to expand them, and the foamed particles thus expanded are then cooled, thereby producing an expansion-molded article, wherein the apparatus is equipped with a compressed-air discharge orifice opening toward the foamed particle filling side of the apparatus in the course of a foamed-particle supply line connecting the hopper to the inlet of the feeder.

The compressed-air discharge orifice in the production apparatus according to the present invention may be formed by joining an auxiliary member for transfer of foamed particles, which comprises a through-hole through which the foamed particles can pass, and a vent hole communicating with the through-hole and having an opening which opens within the through-hole in such a manner that the compressed air can be fed in one direction extending from the through-hole, to a foamed-particle transfer pipe on a foamed-particle supply line connecting the hopper to the inlet of the feeder, so as to direct the compressed air fed through the opening to the side of the feeder. The compressed-air discharge orifice may preferably be provided near an outlet of the hopper. A plurality of the compressed-air discharge orifices may be formed in the course of the foamed-particle supply line connecting the hopper to the inlet of the feeder. It may also be preferable that the open edge on the hopper side of the compressed-air discharge orifice, and the vicinity thereof may be formed in a shape smoothly curved from the vicinity of the open edge to the open edge in a peripheral direction of the foamed-particle supply line.

According to the present invention, there is also provided an auxiliary member for transfer of foamed particles, which comprises a through-hole through which the foamed particles can pass, and a vent hole communicating with the through-hole and adapted to feed compressed air for assisting the transfer of the foamed particles within the through-hole to the through-hole, wherein an opening of the vent hole defined within the through-hole opens in such a manner that the compressed air can be fed in one direction extending from the through-hole.

A compressed-air discharge orifice defined by the opening of the vent hole in the auxiliary member may preferably be such that its open edge on the hopper side and the vicinity thereof are formed in a shape smoothly curved from the vicinity of the open edge to the open edge in a peripheral direction of the auxiliary member for transfer of foamed particles supply line.

According to the present invention, there is further provided a method for producing an expansion-molded article by using a mold equipped with a feeder for filling foamed particles into the mold having a through-hole through which foamed particles can pass and a compressed-air ejection nozzle opening toward the mold, ejecting compressed air from the compressed-air ejection nozzle for a predetermined period of time to fill the foamed particles contained in a hopper into the mold through the feeder, moving a piston of the feeder forward while continuously ejecting the compressed air from the compressed-air ejection nozzle, so as to close a foamed particle introducing opening in the mold, heating the foamed particles filled into the mold to expand them and then cooling the foamed particles thus expanded, wherein upon the filling of the foamed particles, compressed air is fed toward the foamed particle filling side from a compressed-air discharge orifice provided in the course of a foamed-particle supply line connecting the hopper to the inlet of the feeder.

In the production method according to the present invention, the feed of the compressed air from the compressed-air discharge orifice to the foamed-particle supply line may preferably be begun at the time the compressed air is ejected from the compressed-air ejection nozzle, or the time the feed of the compressed air for ejecting the compressed air is started, and terminate at the same time as the time the forward movement of the piston of the feeder is started, or before that, and particularly may preferably be begun at the time the compressed air is ejected from the compressed-air ejection nozzle, or the time the feed of the compressed air for ejecting the compressed air is started, and terminated right before the forward movement of the piston of the feeder is started. The pressure of the compressed air ejected from the compressed-air ejection nozzle may preferably be kept at 1 to 10 kg/cm$^2$G, and the pressure of the compressed air discharged from the compressed-air discharge orifice may preferably be kept at 30 to 95% of the pressure of the compressed air ejected from the compressed-air ejection nozzle.

The above and other objects, features and advantages of the present invention will be readily appreciated as the same becomes better understood from the preferred embodiments of the present invention, which will be described subsequently in detail with reference to the accompanying drawings, and from the appended claims.

DETAILED DESCRIPTION OF THE PREFERRED EMBODIMENTS

Figure 1:
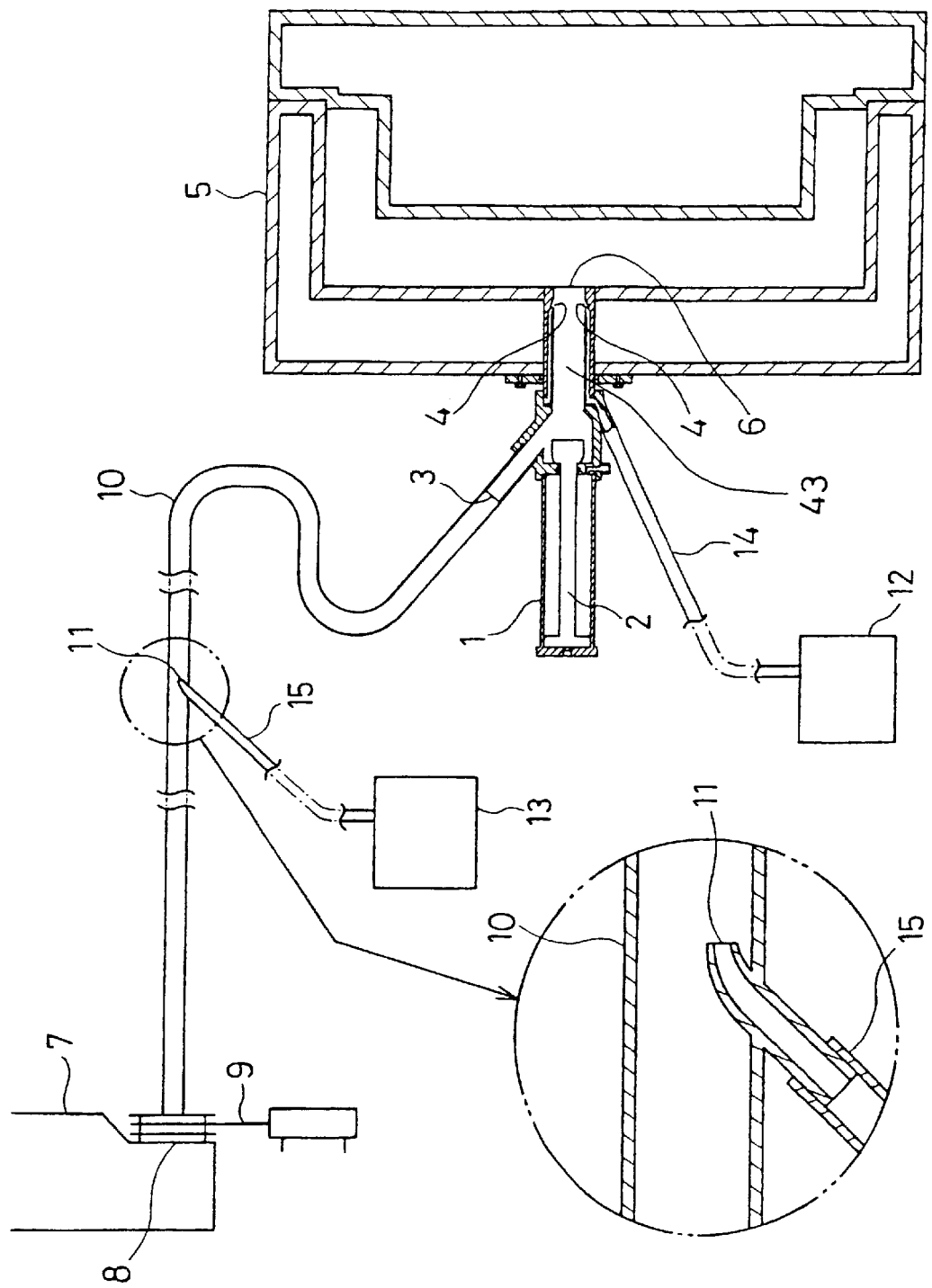
FIG. 1 conceptually illustrates an example of a production apparatus of expansion-molded articles according to the present invention.

The production apparatus of expansion-molded articles according to the present invention will hereinafter be described in detail with reference to the accompanying drawings. FIG. 1 schematically illustrates a hopper, a feeder, a mold, air feed pipes and peripheral devices thereof. The mold and the vicinity thereof are illustrated on an enlarged scale. In FIG. 1, an enlarged view of a compressed-air discharge orifice 11 and the vicinity thereof (a range of a circle drawn by a two-dot chain line) is shown in front of an arrow.

In FIG. 1, reference numeral 1 designates a feeder for filling for foamed particles into the mold, 2 a piston of the feeder 1, 3 an inlet of the feeder 1, 4 a compressed-air ejection nozzle of the feeder 1, 5 a mold, 6 an outlet of the feeder 1 and foamed-particle introducing opening in the mold 5, 7 a hopper, 8 an outlet for foamed particles of the hopper 7, 9 a shutter for opening and closing of the outlet 8 for foamed particles, 10 a transfer pipe on a foamed-particle supply line, 11 a compressed-air discharge orifice provided in the course of the foamed-particle supply line, 12 an air feeder for feeding compressed air toward the compressed-air ejection nozzle 4, 13 an air feeder for feeding compressed air toward the compressed-air discharge orifice 11 provided in the course of the foamed-particle supply line, and 14 and 15 compressed-air feed pipes, and 43 a through-hole.

In general, the compressed-air feeders 12, 13 are each composed of a compressed-air generator, an electromagnetic valve, a pressure control valve, a header and an air transfer pipe connecting them in that order (all, not illustrated). The header of the air feeder 12 is connected to the feeder 1 by the air feed pipe 14. Also, the header of the air feeder 13 is connected to the compressed-air discharge orifice 11 by the air feed pipe 15. Incidentally, the air feeders 12 and 13 may use a common compressed-air generator.

As illustrated in FIG. 1, the feeder 1 having a through-hole 43 and a compressed-air ejection nozzle 4 opening toward the mold 5 is installed on the mold 5 in such a manner that the foamed-particle introducing opening 6 in the mold 5 can be closed with the head of the piston 3 thereof. The compressed-air ejection nozzle 4 is so constructed that an air current is set up by ejecting compressed air, and foamed particles in the hopper 7 are filled into the mold 5 through the foamed-particle feed opening 3 by carrying them on this air current. The foamed particles filled into the mold 5 are heated and then cooled, thereby obtaining an expansion-molded article. Such a production apparatus of expansion-molded articles has been heretofore known. A feature of the present invention resides in that the compressed-air discharge orifice 11 opening toward the feeder 1 side of the apparatus is installed in the course of a foamed-particle supply line connecting the hopper 7 to the feeder 1.

Incidentally, the foamed-particle supply line specifically denotes a supply line including the vicinity of the outlet 8 for foamed particles of the hopper 7, the transfer pipe 10, the vicinity of the inlet 3 of the feeder 1, and the like.

Figure 2A:
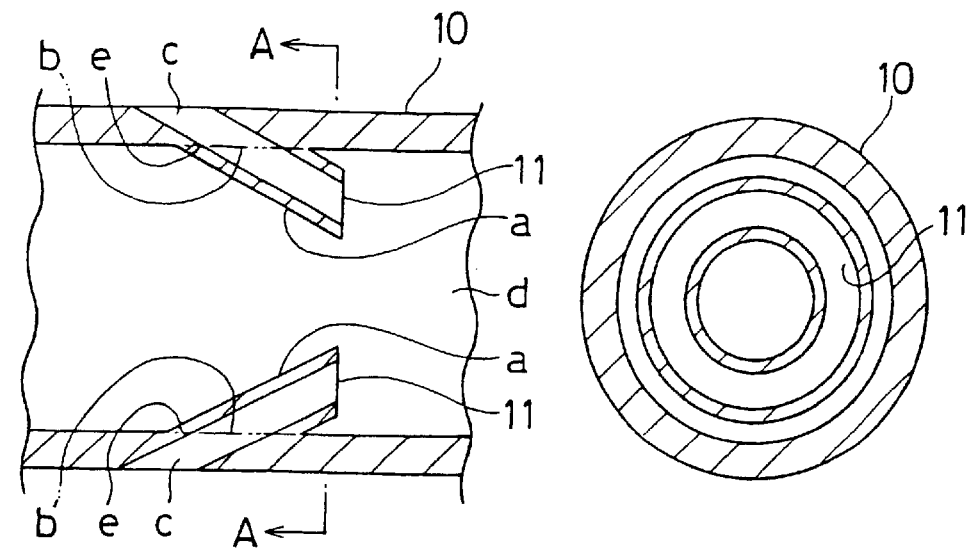
FIGS. 2A to 2C illustrate embodiments of the compressed-air discharge orifice in the production apparatus of the present invention.
Figure 2B:
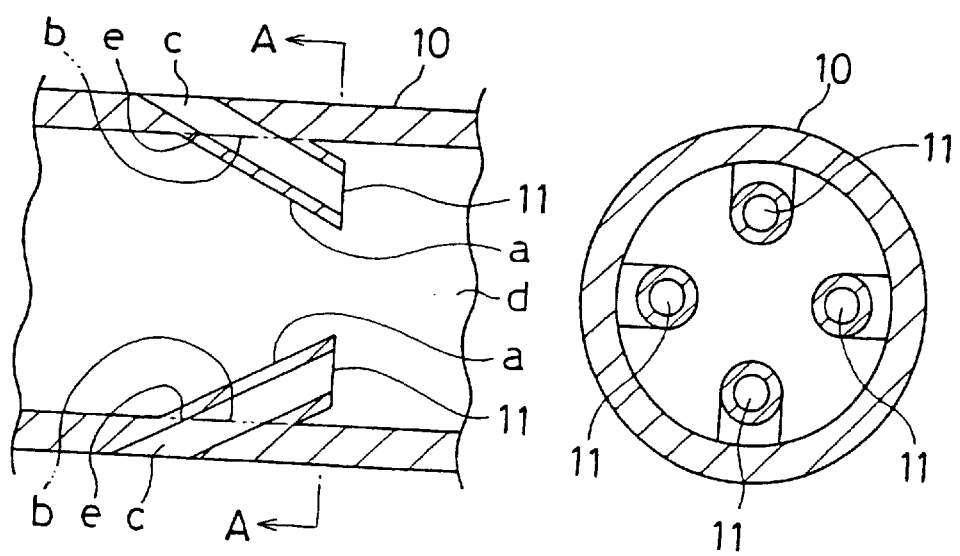
Figure 2C:
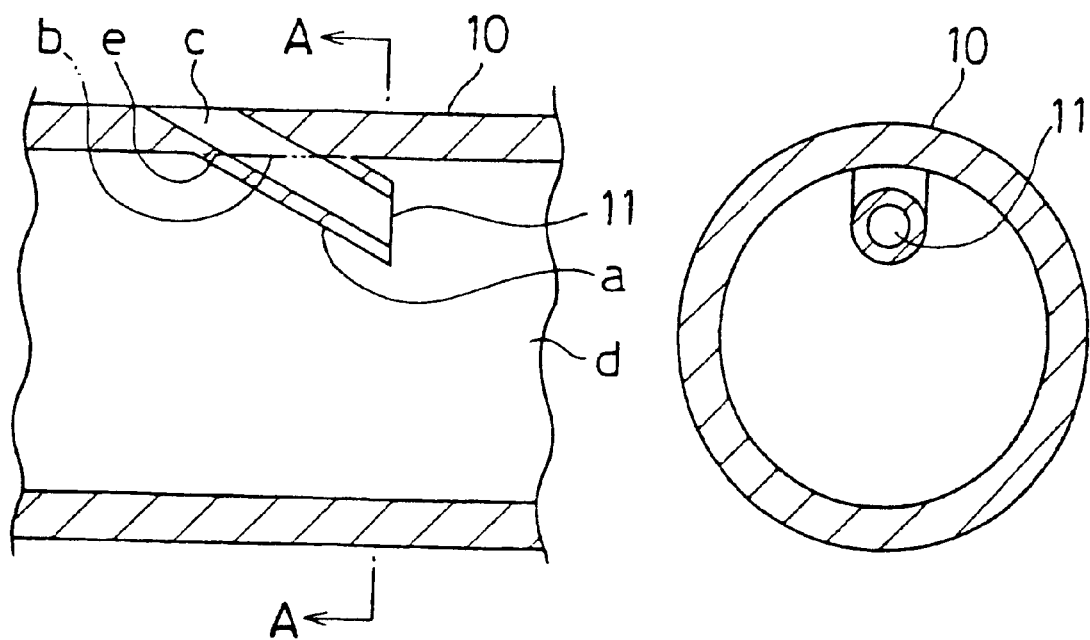

A plurality of the compressed-air discharge orifices 11 may be provided in the course of the foamed-particle supply line. The opening form and structure of the compressed-air discharge orifice may be in any form and structure without limiting to the embodiment illustrated in FIG. 1. As specific examples thereof, may be mentioned embodiments of a circle in section (a ring form irrespective of form such as annular ring or elliptic ring) along the inner surface of the foamed-particle transfer pipe 10 as illustrated in FIG. 2A, a plurality of circular tubes arranged in parallel along the inner surface of the foamed-particle transfer pipe 10 as illustrated in FIG. 2B, and a circular tube as illustrated in FIG. 2C. In each of FIGS. 2A, 2B and 2C, a left drawing is a central longitudinal cross-sectional view taken along the foamed-particle transfer pipe, and a right-hand side leads to the feeder 1. A right drawing thereof is a cross-sectional view taken along line A—A of the left drawing.

The production apparatus according to the present invention is preferably either equipped with a control unit programmed in such a manner that a series of operations described below can be automatically carried out, or so constructed that such a control unit can be installed. The control unit is so programmed that operating cycles of the individual parts of the production apparatus, and the like can be inputted and set from the outside. The setting of the conditions of the operating cycles and the like may be conducted either by operating an input button from the outside or by using a magnetic card. The control unit is electrically connected to the production apparatus of expansion-molded articles to freely control the timing and time of operations of the individual parts in the production apparatus of expansion-molded articles, the distance of piston transfer, and the like, thereby freely controlling conditions such as the pressure of the compressed air upon filling of the foamed particle, the flow rate and filling density of the foamed particles, the time required for the filling, and the time required for blow back of the foamed particles.

In general, the control unit is programmed in such a manner that a series of the operations of the individual parts of the production apparatus is conducted in accordance with the following procedure, and the cycle of a series of operations is carried out repeatedly. The time conditions such as starting time, terminating time and operating time of operation of each part are constituted so as to permit minute setting.

(1) The mold 5 is closed. Incidentally, there are two cases where the mold is completely closed and where the mold is closed with a slight space left (cracking).

(2) The piston 2 of the feeder 1 is moved backward.

(3) Compressed air is fed to the feeder 1 to start ejecting the compressed air from the compressed-air ejection nozzle 4, thereby making the pressure within the foamed-particle supply line negative and at the same time setting up an air current.

(4) Compressed air is fed to the compressed-air discharge orifice 11 to feed the compressed air from the compressed-air discharge orifice 11 toward the feeder 1 in the course of the foamed-particle supply line.

(5) The shutter 9 for opening and closing of an outlet 8 provided near the outlet 8 for foamed particles of the hopper 7 is opened from a closed state to introduce the foamed particles contained in the hopper 7 into the mold 5 through the transfer pipe 10 and the through-hole 43 of the feeder 1 according the current of compressed air.

(6) The feed of the compressed air from the compressed-air discharge orifice 11 in the course of the foamed-particle supply line is stopped.

(7) The piston 2 of the feeder 1 is moved forward to close the foamed-particle introducing opening 6 in the mold 5, thereby completing the filling of the foamed particles.

(8) The ejection of the compressed air from the compressed-air ejection nozzle 4 is continued for a predetermined period of time to conduct blow back of the foamed particles.

(9) The shutter 9 of the hopper is closed, and right after that, the ejection of the compressed air from the compressed-air ejection nozzle 4 is stopped to complete the blow back.

(10) In the case where the mold is closed with a slight space left in the step (1), the mold is completely closed.

(11) The foamed particles in the mold 5 are heated and then cooled to obtain an expansion-molded article.

(12) The mold 5 is opened to remove the expansion-molded article from the mold 5.

The above-described series of operations (1) to (12) is regarded as a cycle, and this cycle is performed repeatedly to continuously produce expansion-molded articles at a certain cycle.

The mutual timing among the continuous steps is as follows.

The step (2) is generally allowed to progress at the same time as the step (1) though it may be conducted before the mold 5 is closed so far as it is conducted before starting to fill the foamed particles.

The feed of the compressed air in the steps (3) and (4) is preferably started at substantially the same time as each other.

The opening of the shutter 9 in the step (5) is preferably started at the same time as the time the feed of the compressed air in the steps (3) and (4) is started, or slightly later than the time the feed of the compressed air in the steps (3) and (4) is started.

The step (6) must be conducted after the foamed particles are fully filled at a proper density into the mold 5, and is preferably carried out right before the piston 2 of the feeder 1 is moved forward.

The step (7) is preferably conducted right after the feed of the compressed air from the compressed-air discharge orifice 11 in the step (6) is stopped.

The step (9) is conducted after the blow back of the foamed particles in the step (8) is carried out for a predetermined period of time to return the foamed particles back to the hopper 7 from within the transfer pipe 10.

The step (10) is preferably conducted either after the step (9) or simultaneously during from the start of the step (8) to the completion of the step (9).

Figure 3:
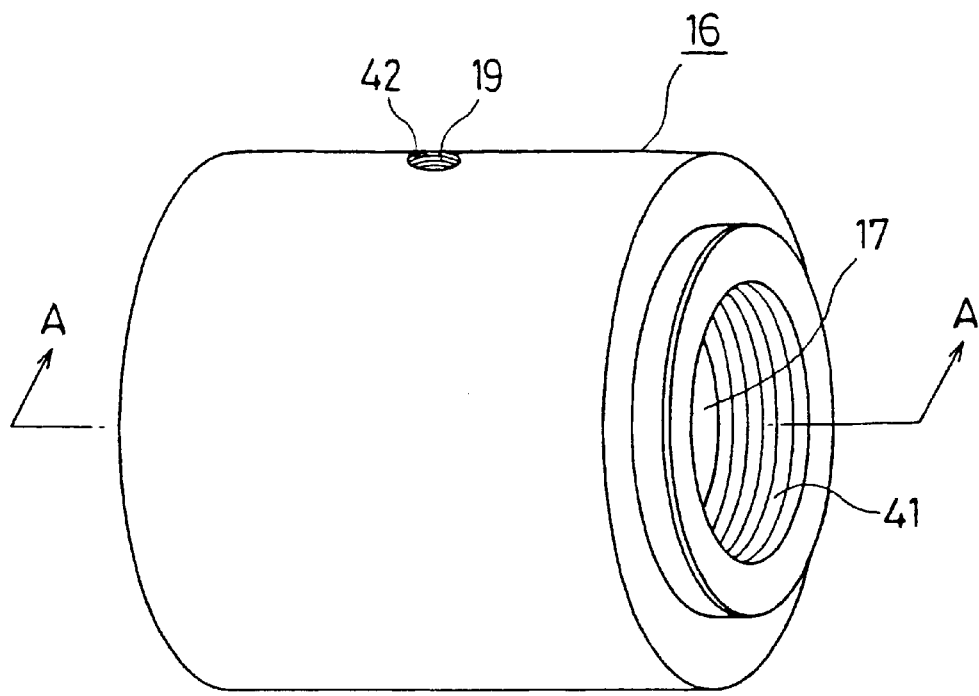
FIG. 3 is a perspective view of an exemplary auxiliary member for transfer of foamed particles used for the formation of a compressed-air discharge orifice.
Figure 4:
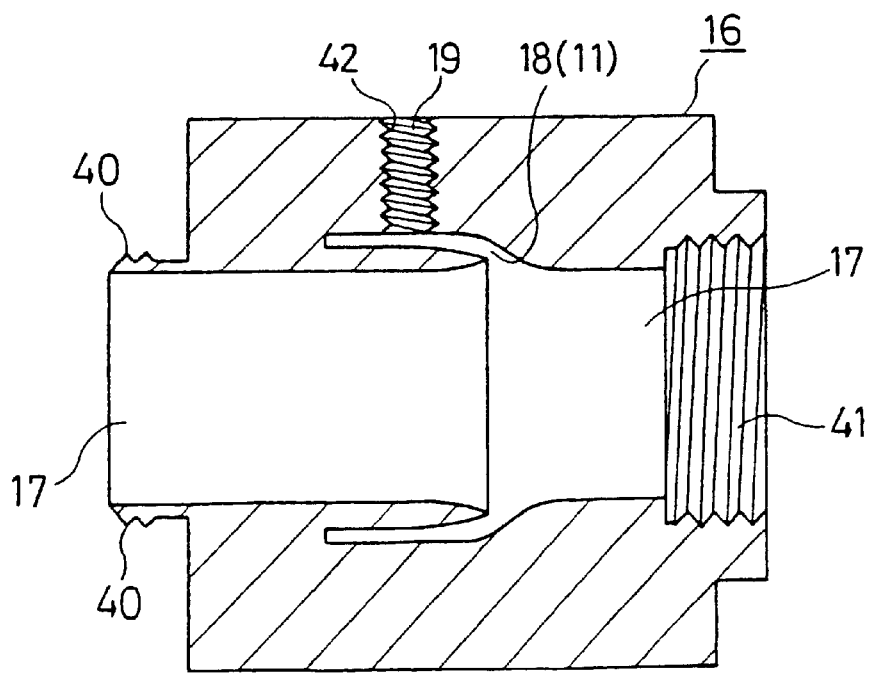
FIG. 4 is a cross-sectional view taken along line A—A of FIG. 3.

In the present invention, the compressed-air discharge orifice 11 may be formed by joining such an auxiliary member 16 for transfer of foamed particles (hereinafter merely referred to as "auxiliary member") as illustrated in FIGS. 3 and 4 in the course of the foamed-particle supply line. FIG. 4 is a cross-sectional view taken along line A—A of the auxiliary member illustrated in FIG. 3. The auxiliary member 16 comprises a through-hole 17 through which the foamed particles can pass, and a vent hole 19 communicating with the through-hole 17 and having an opening 18 which opens within the through-hole 17 in such a manner that compressed air can be discharged in one direction extending from the through-hole 17, and is so constructed that the through-hole 17 becomes a passage through which the foamed particles are transferred, and the opening 18 of the vent hole 19 becomes a compressed-air discharge orifice 11.

The vicinity of the opening 18 of the vent hole 19 is generally formed with a gradient so as to discharge the compressed air fed to the through-hole 17 from the vent hole 19 in one direction extending from the through-hole 17. An internal thread 42 is formed in the vent hole 19 so as to make it easy to join a pipe for feeding the compressed air thereto.

In FIG. 4, an example where the opening 18 is formed in the form of an annular ring in section taken along the inner wall of the through-hole 17 is illustrated. However, the opening 18 in the auxiliary member 16 is not limited to the embodiment illustrated in FIG. 4, and may be formed in a variety of forms and structures serving as such a compressed-air discharge orifice 11 as described above. An external thread 40 and an internal thread 41 are respectively formed at both ends along the through-hole 17 of the auxiliary member 16 so as to make it easy to join the member 16 to the transfer pipe 10 if it is provided in the middle of the pipe 10.

The auxiliary member 16 is joined to, for example, the transfer pipe 10 in the middle of the foamed-particle supply line connecting the hopper 7 to the inlet 3 in such a manner that the direction in which the compressed air is discharged from the opening 18 to the through-hole 17 coincides with the direction in which the foamed particles are supplied, and a compressed-air feed pipe is fitted in the vent hole 19. In such a manner, a compressed-air discharge orifice 11 opening toward the foamed particle filling side of the production apparatus is formed in the middle of the foamed-particle supply line. When the compressed-air discharge orifice 11 is formed by means of such an auxiliary member 16, the auxiliary member 16 is easily attached and detached. Therefore, if trouble of clogging the foamed-particle transfer pipe 10 with foamed particles arises, the clogged foamed particles are easily removed. In addition, there is no need to lay a new pipe for fitting the auxiliary member 16, and it is only necessary to divide the already laid pipe into two pieces and fit the member therebetween. Accordingly, the existing production apparatus can also be simply adapted. Further, the auxiliary member 16 can be produced with ease.

Figure 5:
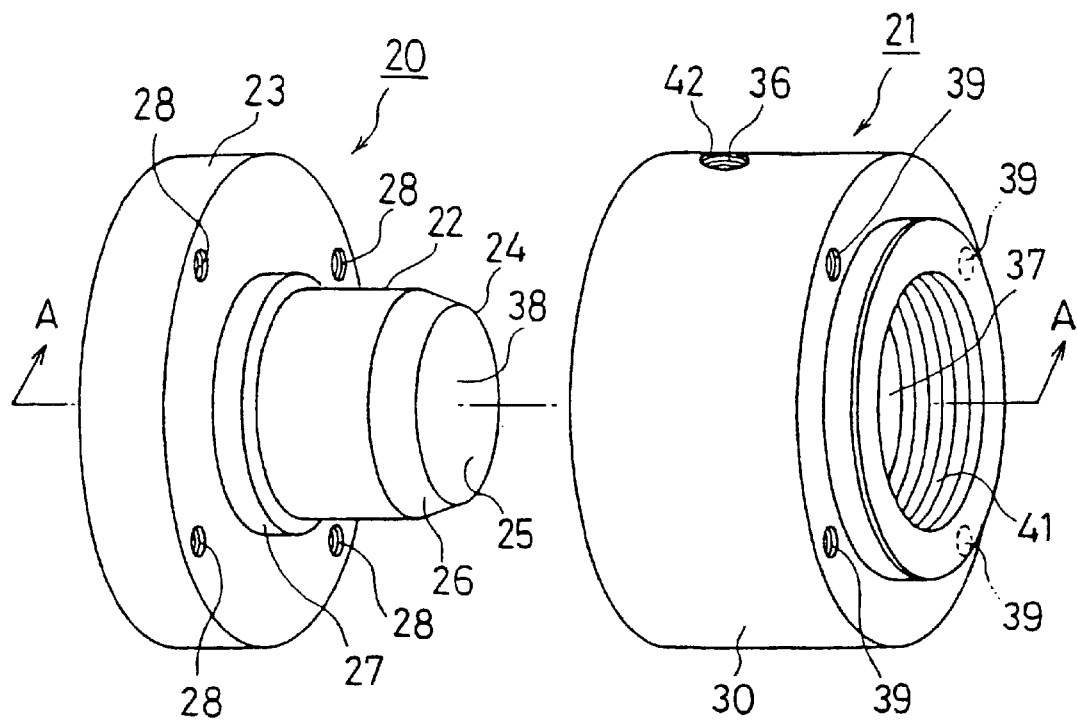
FIG. 5 is an exploded view in perspective of an auxiliary member for transfer of foamed particles used for the formation of a compressed-air discharge orifice illustrating an example where the member is constructed by two parts.
Figure 6:
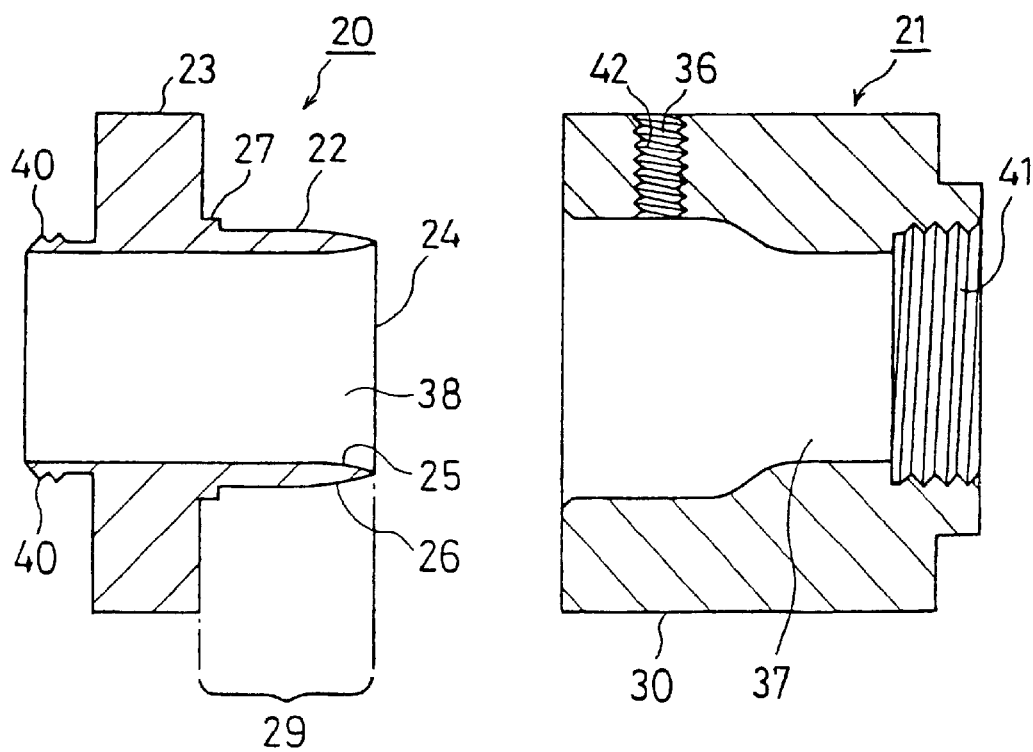
FIG. 6 is a longitudinal cross-sectional view taken along line A—A of FIG. 5.
Figure 7:
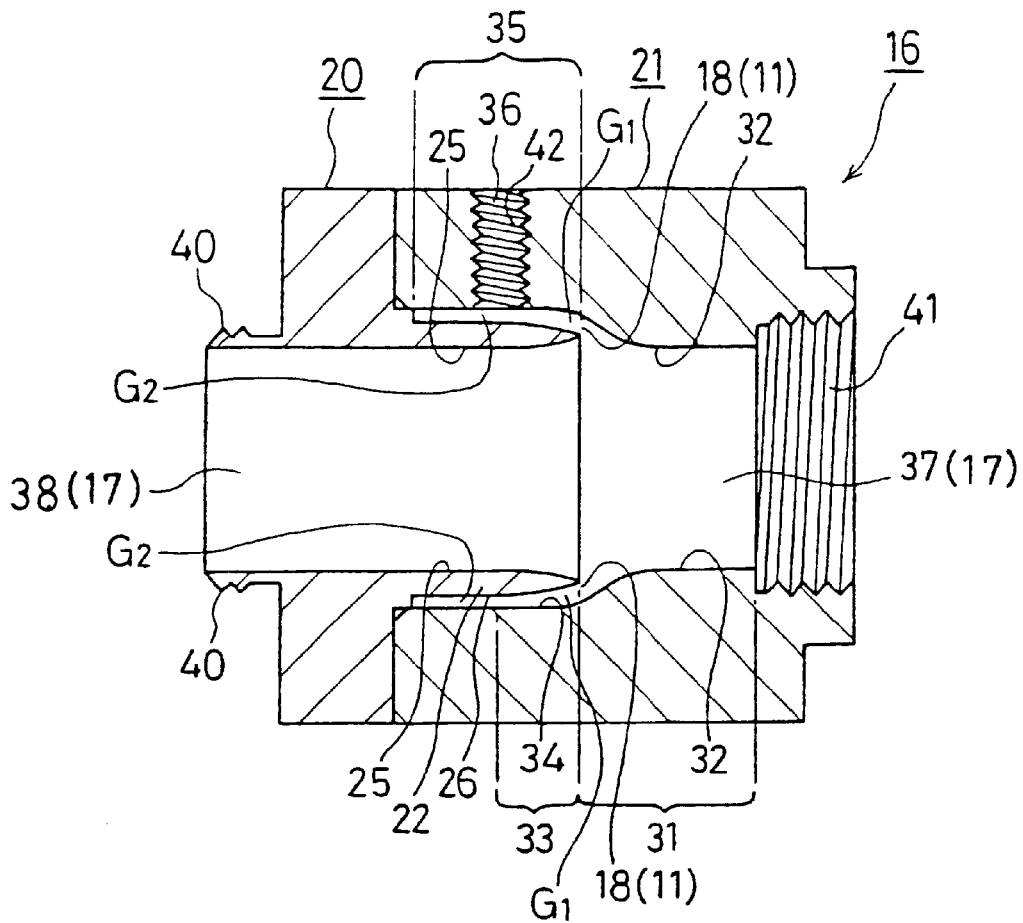
FIG. 7 is a longitudinal cross-sectional view illustrating a state that the parts of the auxiliary member illustrated in FIG. 5 have been integrally joined to each other.

Although the auxiliary member 16 may be formed as an integral structure, it may be constructed by combining at least two parts. For examples, as illustrated in FIGS. 5 to 7, an auxiliary member can be formed from a first part 20 and a second part 21 capable of fitting thereon. FIG. 6 is a longitudinal cross-sectional view taken along line A—A of FIG. 5, and FIG. 7 is a longitudinal cross-sectional view illustrating a state that the first and second parts illustrated in FIG. 5 have been fitted in and on each other into an integral member.

The first part 20 is formed by providing a collar 23 on the periphery of a cylindrical tube 22. The wall thickness in the vicinity of an open end 24 of the tube 22 of the first part 20 is such that the thickness becomes gradually thin toward the open end 24. A thick-wall portion 27 is formed near the base of the collar 23 on the side of the open end 24. Threaded holes 28 extending through in the direction of the thickness of the collar 23 are provided in the collar 23.

As the second part 21, there is used a cylindrical tube 30 so formed that a portion of from the thick-wall portion 27 to the open end 24 of the tube 22 in the first part 20 is inserted, and the thick-wall portion 27 can be fitted therein. As illustrated in FIG. 7, the tube 30 has a thick-wall portion 31 within a predetermined range, which is located in front of the position of the open end 24 of the tube 22 of the first part 20 when the tube 22 is fitted therein, in such a manner that an inner wall 32 at the portion 31 is located on substantially the same line as an extension line from the inner wall 25 of the tube 22. The tube 30 is formed in such a manner that a portion 33 of the second part 21 corresponding to the portion near the open end 24 of the tube 22, at which the wall becomes gradually thin, becomes gradually thin from the thick-wall portion 31 so as to create a space $G_1$ of a certain interval between an inner wall 34 of the portion 33 corresponding to the thin-wall portion of the tube 22 and an outer wall 26 of a portion ranging from the open end 24 to the vicinity thereof in the tube 22 when the tube 22 of the first part 20 is fitted in the tube 30 of the second part 21.

A through-hole 36 for introducing compressed air is provided in the second part 21 at a predetermined position of a portion 35 corresponding to a portion ranging from the thick-wall portion 27 to the open end 24 in the first part 20 when the first part 20 is fitted in the second part 21. An internal thread 42 is cut in the through-hole 36 so as to screw a tip of a compressed-air feed pipe therein. At a part of the portion 35 up to the portion 33, a space $G_2$ of a certain interval is also created between the inner wall 34 of the second part 21 and the outer wall 26 of the tube 22 in the first part 20. The compressed-air introducing hole 36 communicates with the space $G_2$, and the space $G_2$ communicates with the space $G_1$. The space $G_1$ also communicates with an internal space 37 of the tube 30, and the internal space 37 of the tube 30 also communicates with an internal space 38 of the tube 22. The spaces $G_1$ and $G_2$ are preferably within a range of from 0.1 to 0.5 mm, more preferably from 0.2 to 0.4 mm.

As illustrated in FIG. 5, threaded holes 39 extending through in the direction of the tube are also provided in the tube 30. The threaded holes 39 are situated corresponding to the threaded holes 28 provided in the collar 23 of the first part 20.

The first part 20 and second part 21 formed in the above-described manner are fitted in and on each other in such a manner that the threaded holes 28 and 39 correspond to each other, and a screw is inserted into each threaded hole to join the parts into an integral structure as illustrated in FIG. 7, thereby forming the auxiliary member 16. The opening 18 is defined between the outer wall 26 at the open end 24 of the tube 22, and a boundary portion between the inner wall 32 and the inner wall 34 of the tube 30 surrounding the outer wall 26. The space of the opening 18 corresponds to $G_1$. Such an auxiliary member 16 as described above has a relatively complex form, but is useful in that an excellent effect can be brought about on filling of foamed particles. As described above, the auxiliary member 16 is formed by combining at least two parts, thereby obtaining the advantage of being able to produce an auxiliary member in a relatively complex form with ease.

When the tip of the compressed-air discharge orifice 11 is projected within the pipe 10 as illustrated in FIGS. 1 and 2A to 2C, there is a possibility that the transfer of the foamed particles may be blocked upon the blow back thereof, resulting in a failure to conduct efficient blow back, or that the foamed particles may be broken when they come into strong contact with the projected portion(s) (shown by a in FIGS. 2A to 2C). Accordingly, it is desirable to avoid providing the compressed-air discharge orifice 11 in a state projected within the foamed-particle transfer pipe 10 as much as possible.

When the compressed-air discharge orifice 11 is constructed in such a manner that the open edge of the compressed-air discharge orifice 11 is located at a position along a two-dot chain line in each of FIGS. 2A to 2C so as to prevent the tip of the compressed-air discharge orifice 11 from projecting within the pipe 10 (in this case, showing the open edge by b in FIGS. 2A to 2C), the transfer of the foamed particles is not blocked upon the blow back thereof. However, there is a possibility that the foamed particles may be broken. More specifically, the air feed pipe 15 is generally provided in the form that it is inserted in or joined to the pipe 10 from a slanting direction, and so an air passageway c in the air feed pipe 15 or on the extension thereof is constituted so as to slantingly join to a foamed-particle passageway d in the pipe 10. In such an embodiment, a portion e on the hopper side of the open edge b of the compressed-air discharge orifice 11 is generally formed sharp. Namely, the compressed-air discharge orifice 11 comes to have an open edge e like a keen edge of a cutter for the feeder. Therefore, the foamed particles may possibly be broken when they come into strong contact with the open edge e on the hopper side upon the blow back.

On the other hand, in such auxiliary members 16 as illustrated in FIGS. 3 to 7, the inner open edge on the hopper side of the compressed-air discharge orifice 11, and the vicinity thereof are formed in a shape smoothly curved from the vicinity of the open edge to the open edge in the outside direction of the auxiliary member 16. Therefore, the above-described possibility of breaking the foamed particles is avoided. Further, in such auxiliary members 16 as illustrated in FIGS. 3 to 7, an open edge on the side of the feeder 1 of the compressed-air discharge orifice is also formed curvedly. Therefore, there is no possibility that the foamed particles may be damaged upon filling thereof.

Figure 8:
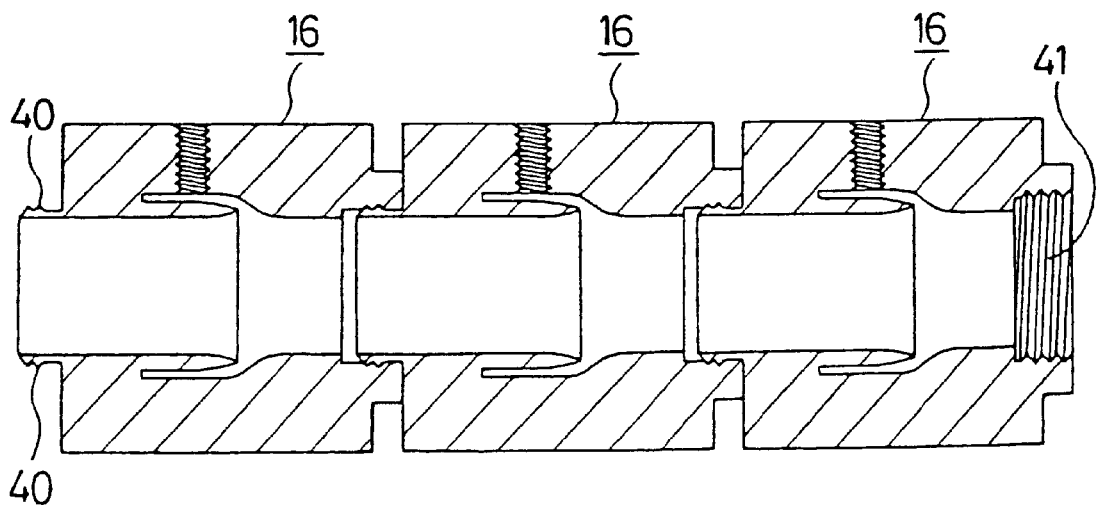
FIG. 8 is a longitudinal cross-sectional view illustrating a state that a plurality of the auxiliary members have been integrally joined to one another.

As illustrated in FIGS. 4 and 7, an external thread 40 and an internal thread 41 are preferably provided on edge faces on the side of both ends of the through-hole 17 of each auxiliary member 16 so as to permit joining a plurality of auxiliary members to one another. FIG. 8 illustrates an embodiment that a plurality of the thus-formed auxiliary members 16 of the same form have been integrally joined to one another. When a plurality of compressed-air discharge orifices are formed in the course of the foamed-particle supply line by providing such a combined member obtained by joining a plurality of the auxiliary members on the foamed-particle supply line, the transfer of the foamed particles can be effectively enhanced.

Figure 9:
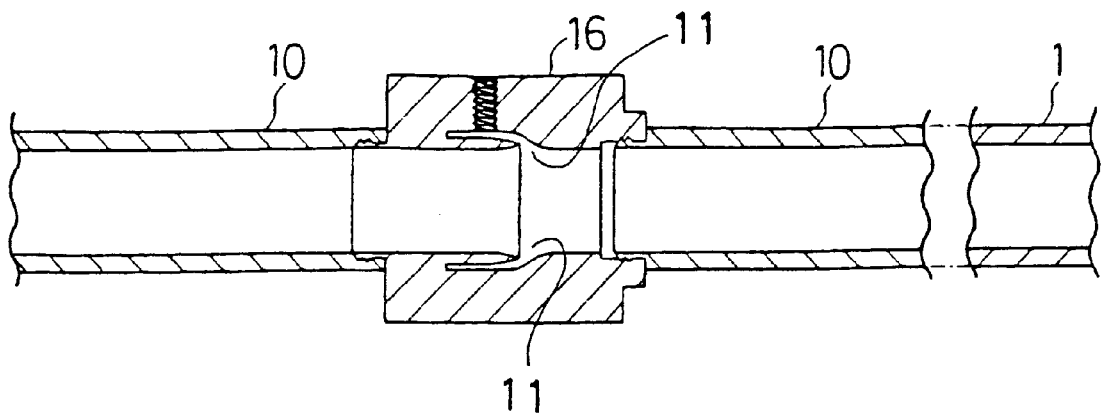
FIG. 9 is a longitudinal cross-sectional view illustrating an example where the auxiliary member is connected to a foamed-particle transfer pipe to form a compressed-air discharge orifice.
Figure 10:
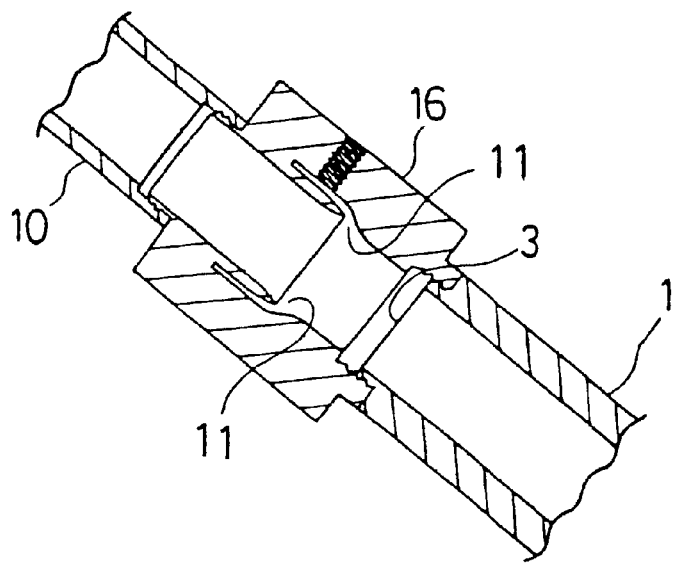
FIG. 10 is a longitudinal cross-sectional view illustrating another example where the auxiliary member is connected to a foamed-particle transfer pipe to form a compressed-air discharge orifice.

In the present invention, the compressed-air discharge orifice 11 may be provided at any position so far as it is on the foamed-particle supply line. FIGS. 9 to 12 illustrate examples where the auxiliary member 16 is used to provide the compressed-air discharge orifice 11. FIG. 9 illustrates an example where the compressed-air discharge orifice 11 is provided in the middle of the transfer pipe 10 connecting the hopper 7 to the feeder 1, FIG. 10 an example where it is provided at a position coming into contact with the feeder 1, and FIG. 11 an example where it is provided at a position coming into contact with the hopper 7. When the transfer pipe 10 is inserted into the hopper 7, the auxiliary member 16 may be provided in such a manner that it is located within the hopper 7 as illustrated in FIG. 12. As described above, the compressed-air discharge orifice 11 may be provided at any position so far as it is on the foamed-particle supply line.

Figure 11:
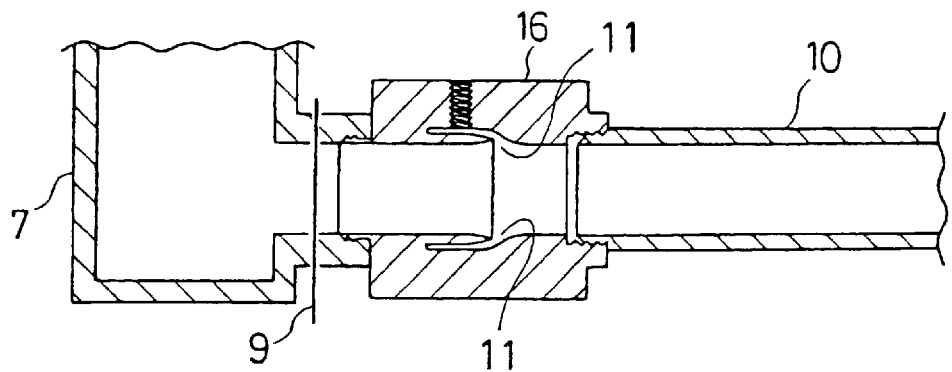
FIG. 11 is a longitudinal cross-sectional view illustrating a further example where the auxiliary member is connected to a foamed-particle transfer pipe to form a compressed-air discharge orifice.
Figure 12:
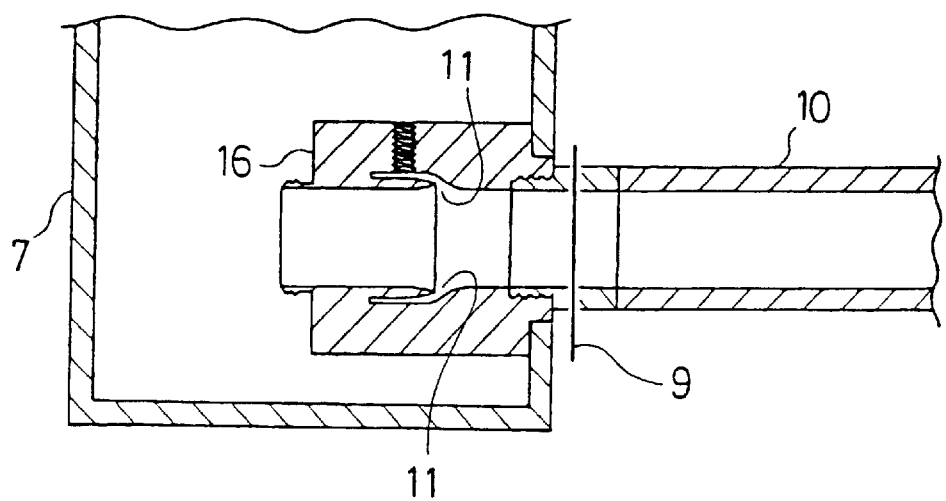
FIG. 12 is a longitudinal cross-sectional view illustrating a still further example where the auxiliary member is connected to a foamed-particle transfer pipe to form a compressed-air discharge orifice.

In the present invention, however, the compressed-air discharge orifice 11 is most preferably provided near an outlet of the hopper 7 as illustrated in FIG. 11 or 12. The most preferred embodiment has the advantage of being able to efficiently assist the transfer of the foamed particles by using the least amount of compressed air and so to fully and reliably fill the foamed particles into the mold at high efficiency.

The production method of an expansion-molded articles according to the present invention will hereinafter be described. In the production method of the expansion-molded article according to the present invention, molding is conducted by using, for example, the production apparatus of expansion-molded articles, in which such an auxiliary member 16 as described above is installed in the course of the foamed-particle supply line in such a manner that compressed air is discharged from the opening 18 of the vent hole 19 toward the foamed particle filling side (the side of the feeder 1) of the production apparatus to use the opening 18 as the compressed-air discharge orifice 11. A feature of the production method resides in that upon filling of foamed particles, the compressed air is fed through the compressed-air discharge orifice 11 toward the foamed particle filling side on the foamed-particle supply line during the filling of the foamed particles from a hopper to a mold, or for a predetermined period of time within the time required for the filling of the foamed particles.

More specifically, compressed air fed from the compressed-air feeder 12 is ejected from the compressed-air ejection nozzle 4, and compressed air fed from the compressed-air feeder 13 is fed into the foamed-particle transfer pipe 10 through the compressed-air discharge orifice 11 for a predetermined period of time during the ejection of the compressed air from the compressed-air ejection nozzle 4 to make the pressure within the foamed-particle supply line negative and at the same time set up an air current. The shutter for opening and closing of an outlet provided near the outlet for the foamed particles of the hopper is opened from a closed state to introduce the foamed particles contained in the hopper into the transfer pipe making good use of sucking action.

The foamed particles introduced into the transfer pipe 10 by the negative pressure and air current created in the transfer pipe 10 by ejecting the compressed air from the compressed-air ejection nozzle 4 are sucked into the foamed-particle feed opening 3 in the feeder 1 and filled into the mold 5 through the feeder 1.

The interior of the hopper 7 is generally under atmospheric pressure. However, the interior of the hopper 7 may be pressurized as needed. When the interior of the hopper 7 is pressurized, the pressure is kept at 3.0 kg/cm$^2$G or lower.

After the foamed particles are filled into the mold 5 at a proper even density, the piston of the feeder 1 is moved forward to close the foamed-particle introducing opening 6 in the mold 5, thereby completing the filling of the foamed particles into the mold 5. During this operation, the ejection of the compressed air from the compressed-air ejection nozzle 4 of the feeder 1 is continuously conducted. In the present invention, additional compressed air is fed toward the foamed-particle filling side from the compressed-air discharge orifice 11 provided on the foamed-particle supply line upon the filling of the foamed particles. Therefore, the foamed particles are fully filled at a proper even filling density into the mold 5. When the foamed particles are fully filled into the mold 5, they are not filled beyond that. Therefore, excess foamed particles are returned in the direction of the inlet 3 of the feeder 1 by the compressed air continuously ejected from the compressed-air ejection nozzle 4. At this time, the piston 2 is moved forward to close the foamed-particle introducing opening 6 in the mold 5.

Even after the foamed-particle introducing opening 6 in the mold 5 is closed, the compressed air is continuously ejected from the compressed-air ejection nozzle 4, thereby push the excess foamed particles within the feeder 1 and the pipe 10 back to the hopper 7. This operation is called blow back. The blow back is completed by closing the shutter 9 of the hopper 7 after the excess foamed particles are returned back to the hopper 7. Incidentally, the feed of the compressed air from the compressed-air discharge orifice 11 to the foamed-particle transfer pipe 10 is terminated before the piston 2 of the feeder 1 is moved forward. However, the present invention is not limited thereto. After completion of the blow back, the foamed particles filled into the mold 5 are heated to expand them, and then cooled, thereby obtaining an expansion-molded article.

Figure 13:
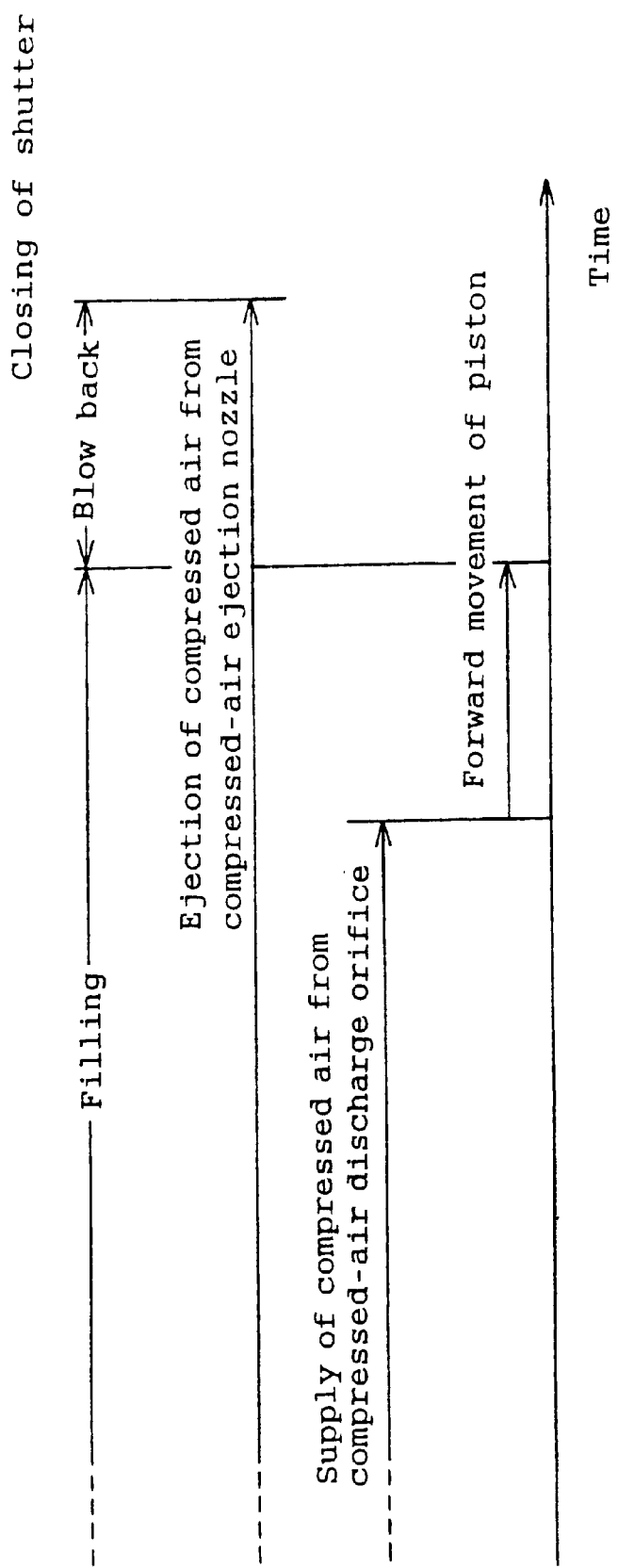
FIG. 13 is an explanatory drawing illustrating an example of timing among ejection and discharge of respective compressed air, and forward movement of a piston.
Figure 14:
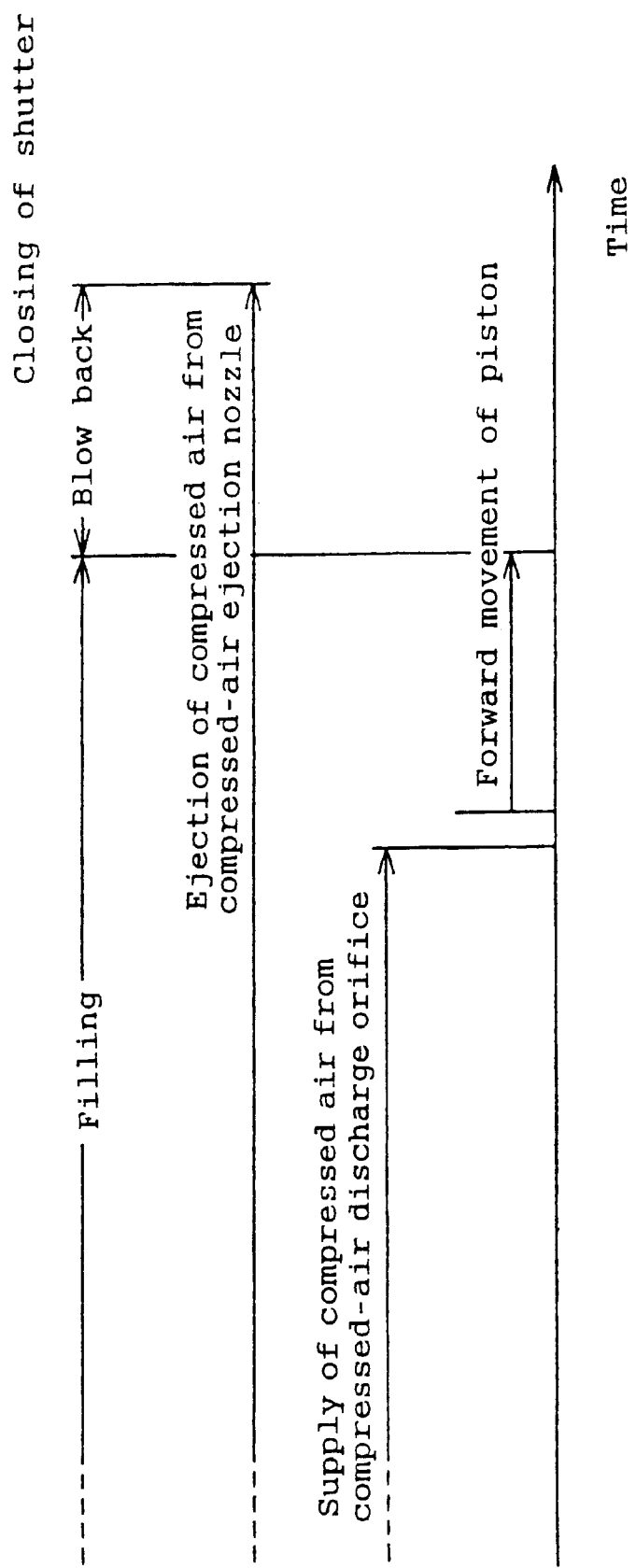
FIG. 14 is an explanatory drawing illustrating another example of timing among ejection and discharge of respective compressed air, and forward movement of a piston.
Figure 15:
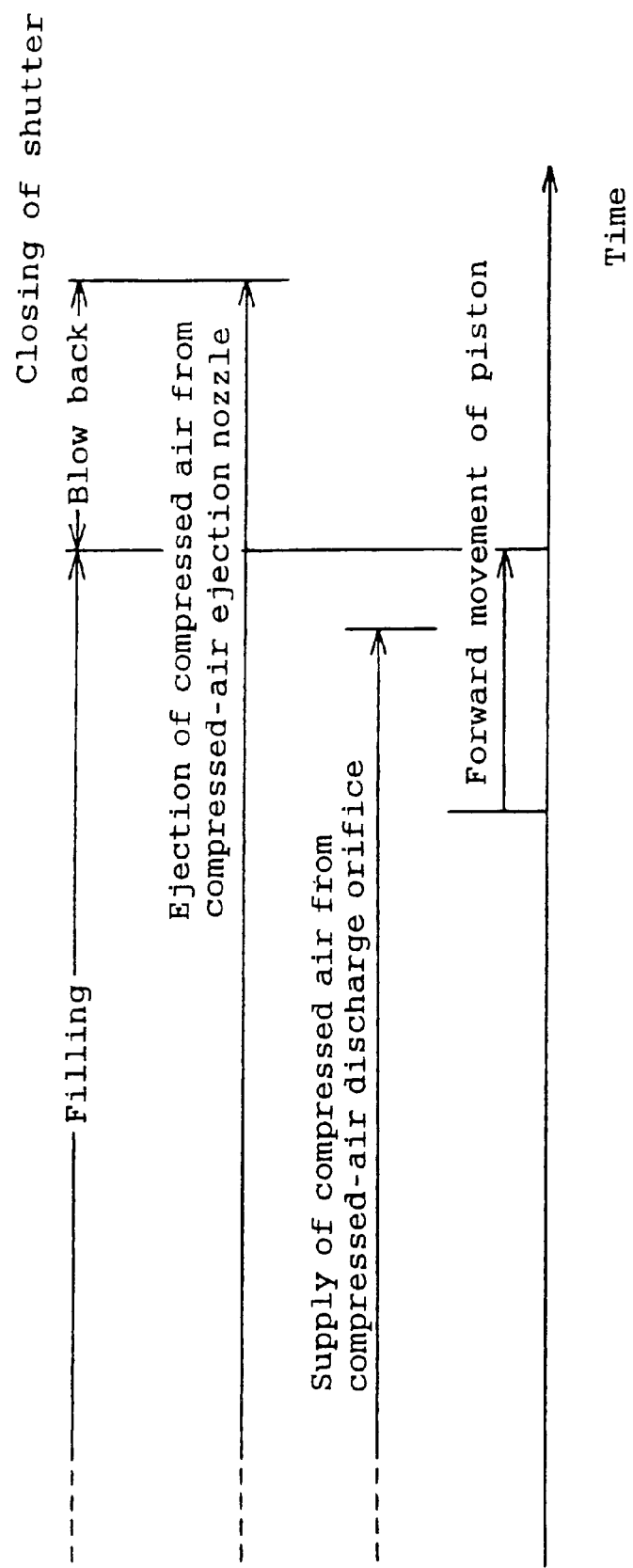
FIG. 15 is an explanatory drawing illustrating a further example of timing among ejection and discharge of respective compressed air, and forward movement of a piston.

Three examples as to timing among the above-described ejection of the compressed air from the compressed-air ejection nozzle 4, discharge of the compressed air from the compressed-air discharge orifice 11, opening and closing operation of the shutter 9 of the hopper 7 and forward movement of the piston 2 of the feeder 1 are illustrated in FIGS. 13 to 15. FIG. 13 illustrates the timing in the case of the above-described embodiment. FIGS. 14 and 15 illustrate other examples. The abscissa axis in each drawing indicates passage of time.

In the present invention, it is preferable that the time the compressed air is discharge from the compressed-air discharge orifice 11 be harmonized with the time the compressed air is ejected from the compressed-air ejection nozzle 4, and the discharge of the compressed air from the compressed-air discharge orifice 11 be terminated at the same time as the time the forward movement of the piston of the feeder 1 is started, or before that as illustrated in FIGS. 13 and 14. After this manner, it is avoided to wastefully use the compressed air fed from the compressed-air discharge orifice 11 into the transfer pipe 10, so that the object can be efficiently achieved.

It is particularly preferable that the discharge of the compressed air from the compressed-air discharge orifice 11 be terminated right before the forward movement of the piston 2 of the feeder 1 is started as illustrated in FIG. 13. Such timing has advantages that the molding cycle can be performed without any lost time, and that a possibility that the blow back of the foamed particle may be blocked is eliminated, in addition to the above-described effects.

In the present invention, it is preferable that the pressure of the compressed air ejected from the compressed-air ejection nozzle 4 be kept at 1 to 10 kg/cm$^2$G, and the pressure of the compressed air discharged from the compressed-air discharge orifice 11 be kept at 30 to 95% of the pressure of the compressed air ejected from the compressed-air ejection nozzle 4. These pressures are both values expressed in terms of the main pressure of the compressed air fed from each of the compressed-air feeders. After this manner, the foamed particles can be filled into the mold without causing any failure in filling of the foamed particles, and so defective molding attendant on the failure in filling can be eliminated or reduced with higher certainty. In addition, it is also possible to prevent wasteful use of the compressed air.

The production method of expansion-molded articles according to the present invention will hereinafter be described more specifically by the following examples. Incidentally, a production apparatus used in the following examples is an apparatus in which the auxiliary member 16 illustrated in FIG. 7 has been installed in the foamed-particle transfer pipe 10 near the outlet of the hopper 7 as illustrated in FIG. 11.

EXAMPLE 1 AND COMPARATIVE EXAMPLE 1

Foamed particles having a bulk density of 0.015 g/cm$^3$, which had been obtained by foaming particles of a propylene-ethylene random copolymer resin having an ethylene content of 4.0 wt. % without crosslinking, were used as foamed particles and filled into a mold equipped with 4 feeders by presetting the pressure of compressed air ejected from a compressed-air ejection nozzle of each of the feeders to 7.0 kg/cm$^2$G. The foamed particle in the mold were heated with super-heated steam and then cooled with water, thereby obtaining an expansion-molded article having the target size of 910 mm in length, 263 mm in width and 80 mm in thickness (the thickness of 45 mm-portions at both lengthwise ends: 60 mm).

In Example 1, upon the supply of the foamed particles, compressed air of a pressure of 4.5 kg/cm$^2$G was discharged toward the feeders from respective compressed-air discharge orifices provided in foamed-particle transfer pipes. The discharge of the compressed air was begun at the time the compressed air was ejected from the compressed-air ejection nozzle of each feeder and terminated at the time (right before) the forward movement of the piston of the feeder was started.

One hundred expansion-molded articles thus produced were transferred to an aging room preset at 55° C. under atmospheric pressure immediately after the production to age them for 24 hours in the aging room. The molded articles were taken out of the aging room and left to stand for 24 hours under conditions of ordinary temperature and atmospheric pressure to further age them. The length, width and thickness of each expansion-molded article were then measured. As a result, the lower size limit and upper size limit among the 100 expansion-molded articles were found to be 99.9% and 100.3%, respectively, when the target size was regarded as 100%, and so extremely high dimensional accuracy was achieved.

On the other hand, in Comparative Example 1, molding was carried out by using a molding machine equipped with the same mold and feeders as those used in Example 1 and filling the same foamed particles as those used in Example 1 into the mold without discharging compressed air from any compressed-air discharge orifice. One hundred expansion-molded articles thus produced were aged for 24 hours in the aging room and then for 24 hours under conditions of ordinary temperature and atmospheric pressure outside the aging room in the same manner as in Example 1. The sizes of the expansion-molded articles were then measured likewise. As a result, the lower size limit and upper size limit among the 100 expansion-molded articles were found to be 98.0% and 101.1%, respectively, when the target size of the expansion-molded article was regarded as 100%, and so Comparative Example 1 simply exhibited poor dimensional accuracy compared with Example

EXAMPLE 2 AND COMPARATIVE EXAMPLE 2

Foamed particles having a bulk density of 0.024 g/cm$^3$, which had been obtained by foaming particles of a linear low-density polyethylene resin having a density of 0.925 g/cm$^3$ without crosslinking, were used as foamed particles and filled into a mold equipped with 4 feeders by presetting the pressure of compressed air ejected from a compressed-air ejection nozzle of each of the feeders to 7.0 kg/cm$^2$G. The foamed particle in the mold were heated with super-heated steam and then cooled with water, thereby obtaining a substantially cylindrical expansion-molded article having the target size of 700 mm in diameter and 900 mm in height.

In Example 2, upon the supply of the foamed particles, compressed air of a pressure of 5.5 kg/cm$^2$G was discharged toward the feeders from respective compressed-air discharge orifices provided in foamed-particle transfer pipes. The discharge of the compressed air was begun at the time the compressed air was ejected from the compressed-air ejection nozzle of each feeder and terminated at the time (right before) the forward movement of the piston of the feeder was started.

One hundred expansion-molded articles thus produced were transferred to an aging room preset at 80° C. under atmospheric pressure immediately after the production to age them for 24 hours in the aging room. The molded articles were taken out of the aging room and left to stand for 24 hours under conditions of ordinary temperature. The diameter and height of each expansion-molded article were then measured. As a result, the lower size limit and upper size limit among the 100 expansion-molded articles were found to be 99.6% and 100.5%, respectively, when the target size of the molded article was regarded as 100%, and so extremely high dimensional accuracy was achieved.

On the other hand, in Comparative Example 2, molding was carried out by using a molding machine equipped with the same mold and feeders as those used in Example 2 and filling the same foamed particles as those used in Example 2 into the mold without discharging compressed air from any compressed-air discharge orifice. One hundred expansion-molded articles thus produced were aged in the same manner as in Example 2, and the sizes of the expansion-molded articles were then measured likewise. As a result, the lower size limit and upper size limit among the 100 expansion-molded articles were found to be 96.8% and 101.0%, respectively, when the target size of the expansion-molded article was regarded as 100%, and so Comparative Example 2 simply exhibited poor dimensional accuracy compared with Example 2.

EXAMPLE 3 AND COMPARATIVE EXAMPLE 3

Foamed particles having a bulk density of 0.035 g/cm$^3$, which had been obtained by crosslinking particles of a branched low-density polyethylene resin having a density of 0.923 g/cm$^3$ to a gel fraction of 53 wt. % and then foaming them, were used as foamed particles and filled into a mold equipped with a feeder by presetting the pressure of compressed air ejected from a compressed-air ejection nozzle of the feeder to 7.0 kg/cm$^2$G. The foamed particle in the mold were heated with super-heated steam and then cooled with water, thereby obtaining an expansion-molded article having the target size of 360 mm in length, 110 mm in width and 10 mm in thickness (having upstand walls of 20 mm in height and 10 mm in width at both widthwise ends).

In Example 3, upon the supply of the foamed particles, compressed air of a pressure of 4.0 kg/cm$^2$G was discharged toward the feeder from a compressed-air discharge orifice provided in a foamed-particle transfer pipe. The discharge of the compressed air was begun at the time the compressed air was ejected from the compressed-air ejection nozzle of the feeder and terminated at the time (right before) the forward movement of the piston of the feeder was started. With respect to expansion-molded articles obtained after the molding, the percent defective due to lack of the foamed particles at the upstand wall portions was 0.3%.

On the other hand, in Comparative Example 3, molding was carried out by filling the foamed particles into the mold without discharging compressed air from any compressed-air discharge orifice. With respect to expansion-molded articles obtained after the molding, the percent defective due to lack of the foamed particles at the upstand wall portions was 19.6%.

EXAMPLE 4 AND COMPARATIVE EXAMPLE 4

Foamed particles having a bulk density of 0.035 g/cm$^3$, which had been obtained by crosslinking particles of a branched low-density polyethylene resin having a density of 0.923 g/cm$^3$ to a gel fraction of 53 wt. % and then foaming them, were used as foamed particles and filled into a mold by presetting the pressure of compressed air ejected from a compressed-air ejection nozzle of a feeder to 7.0 kg/cm$^2$G. The foamed particle in the mold were heated with superheated steam and then cooled with water, thereby obtaining an expansion-molded article having the target size of 700 mm in length, 700 mm in width and 200 mm in thickness (partially having an upstand wall of 20 mm in height and 12 mm in width).

In Example 4, upon the supply of the foamed particles, compressed air of a pressure of 6.0 kg/cm$^2$G was discharged toward the feeder from a compressed-air discharge orifice provided in a foamed-particle transfer pipe. The discharge of the compressed air was begun at the time the compressed air was ejected from the compressed-air ejection nozzle of the feeder and terminated at the time (right before) the forward movement of the piston of the feeder was started. The molding was carried out with the number of feeders installed on a mold (for providing a molded article) varied to determine the number of feeders required to reduce the percent defective of the resulting expansion-molded articles due to lack of the foamed particles at the upstand wall portions to at most 0.5%. As a result, 4 feeders per mold were required.

On the other hand, in Comparative Example 4, molding was carried out by filling the foamed particles into the mold without discharging compressed air from any compressed-air discharge orifice. The molding was carried out with the number of feeders installed on a mold (for providing a molded article) varied to determine the number of feeders required to reduce the percent defective of the resulting expansion-molded articles due to lack of the foamed particles at the upstand wall portions to at most 0.5%. As a result, 11 feeders per mold were required.

Advantages of the Invention

According to the production apparatus of expansion-molded articles of the present invention constructed as described above, the filling factor can be enhanced simply by feeding compressed air to a foamed-particle supply line from the outside, so that defective molding can be greatly reduced.

According to the production method of expansion-molded articles of the present invention, foamed particles can be filled into a mold without any failure in filling, so that problems of chipping of molded articles and shrinkage of molded articles after molding can be solved, and expansion-molded articles having excellent dimensional accuracy can be provided. Accordingly, defective molding such as deteriorated dimensional accuracy due to chipping, shrinkage, deformation and the like of the resulting molded articles can be greatly reduced. In addition, since the filling factor of foamed particles can be greatly enhanced without installing any additional feeder, the problem that the number of marks of the tip form of the feeder transferred to the surface of the resulting expansion-molded article is increased to deteriorate the external appearance of the expansion-molded article can also be solved.

What is claimed is:

1. A method for producing an expansion-molded article by
using a mold equipped with a feeder for filling foamed particles into the mold having a through-hole through which foamed particles can pass and a compressed-air ejection nozzle opening toward the mold, by which foamed particles contained in a hopper are filled into the mold through a transfer pipe connecting the hopper to the through hole of the feeder, ejecting compressed air from the compressed-air ejection nozzle for a predetermined period of time to fill the foamed particles contained in a hopper into the mold through the feeder, moving a piston of the feeder forward while continuously ejecting the compressed air from the compressed-air ejection nozzle, so as to close a foamed particle introducing opening in the mold, heating the foamed particles filled into the mold to expand them and then cooling the foamed particles thus expanded, wherein upon the filling of the foamed particles, compressed air is fed toward the foamed particle filling side from a compressed-air discharge orifice disposed on the inner surface of the transfer pipe and opening toward the foamed particle filling side of the apparatus connecting the hopper in the course of a foamed-particle transfer pipe connecting the hopper to the inlet of the feeder.

2. The method according to claim 1, wherein the feed of the compressed air from the compressed-air discharge orifice to the foamed-particle supply line is begun at about the time the compressed air is ejected from the compressed-air ejection nozzle, and terminated at the same time as the time the forward movement of the piston of the feeder is started, or before that.

3. The method according to claim 1, wherein the feed of the compressed air from the compressed-air discharge orifice to the foamed-particle supply line is begun at about the time the compressed air is ejected from the compressed-air ejection nozzle, and terminated right before the forward movement of the piston of the feeder is started.

4. The method according to claim 1, wherein the pressure of the compressed air ejected from the compressed-air ejection nozzle is kept at 1 to 10 kg/cm$^2$G, and the pressure of the compressed air discharged from the compressed-air discharge orifice is kept at 30 to 95% of the pressure of the compressed air ejected from the compressed-air ejection nozzle.

5. The method according to claim 1, comprising the further step of:

supplying compressed air through an auxiliary member, wherein the compressed air is flowing from the compressed-air discharge orifice toward the foamed-particle filling side, wherein said auxiliary member has
a first member having a cylindrical tube, and
a second member having a cylindrical tube capable of engaging therewith and are engaged and structured on said foamed-particle transfer pipe connecting the hopper and said foamed-particle feeder inlet, wherein
a gap is formed between an outer wall of the cylindrical tube of the first member and an inner wall of the cylindrical tube of the second member,
a compressed-air discharge orifice opening toward the foamed particle filling side is formed between a tip wall of the cylindrical tube of the first member and an internal wall of the cylindrical tube of the second member, wherein said gap and compressed-air discharge orifice are in communication.

6. The method according to claim 5, having a plurality of cylindrically shaped auxiliary members having a through-hole for introducing compressed-air leading to said gap.

* * * * *